April 19, 1960   L. L. MELLAM   2,933,053
RAILWAY CAR FOR TRANSPORTING TRAILER BODIES
Filed May 28, 1957   2 Sheets-Sheet 1
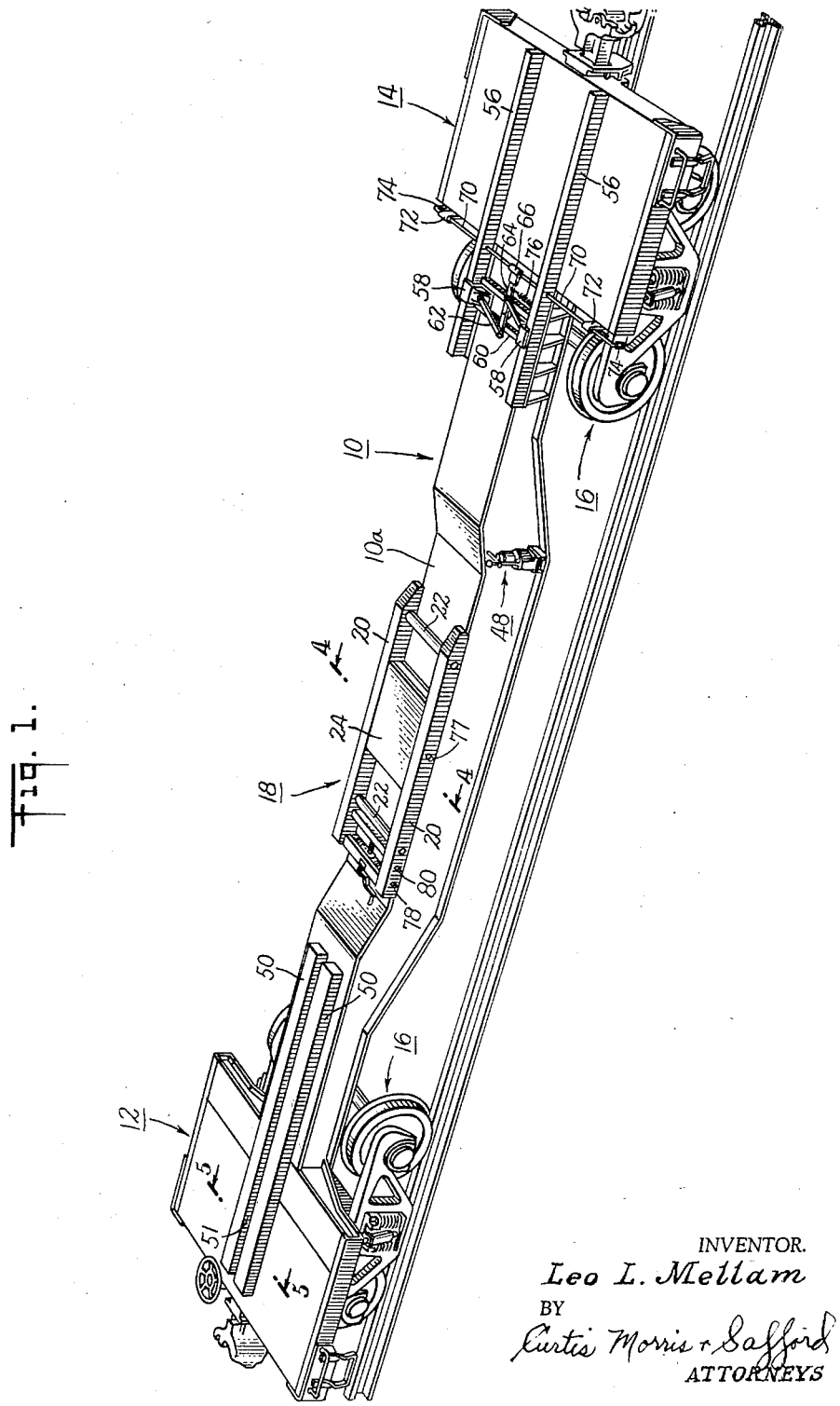
INVENTOR.
Leo L. Mellam
BY
Curtis, Morris & Safford
ATTORNEYS April 19, 1960          L. L. MELLAM          2,933,053
RAILWAY CAR FOR TRANSPORTING TRAILER BODIES
Filed May 28, 1957          2 Sheets-Sheet 2
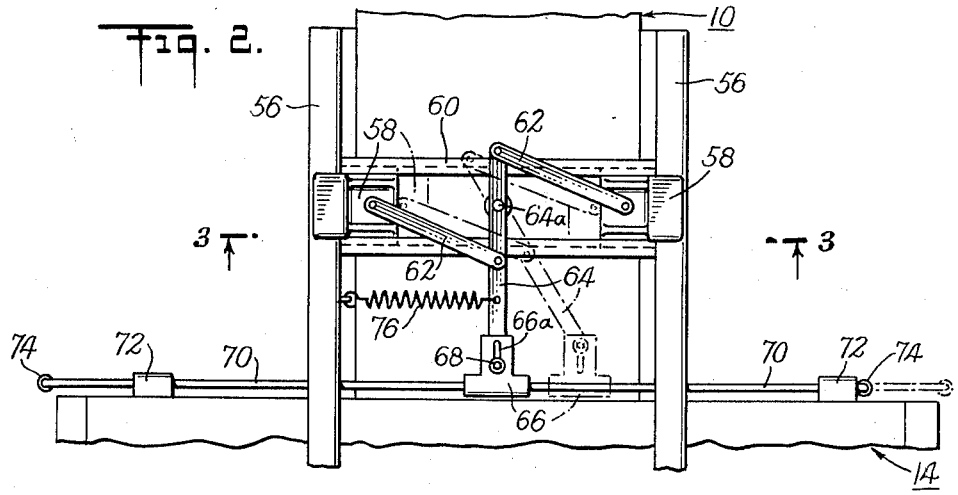
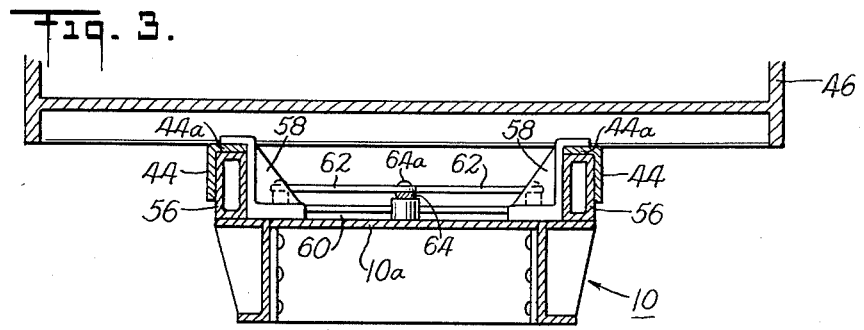
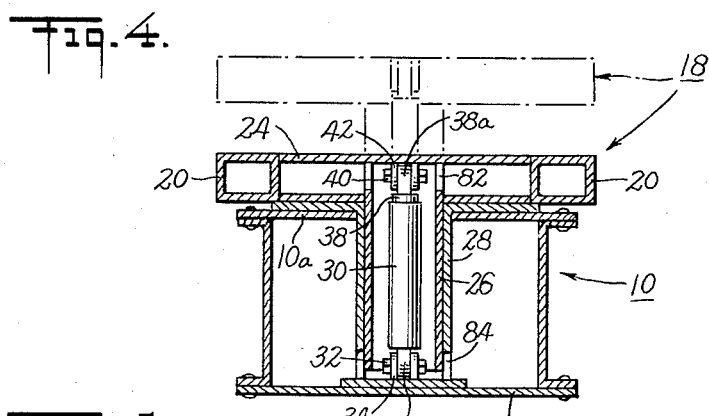
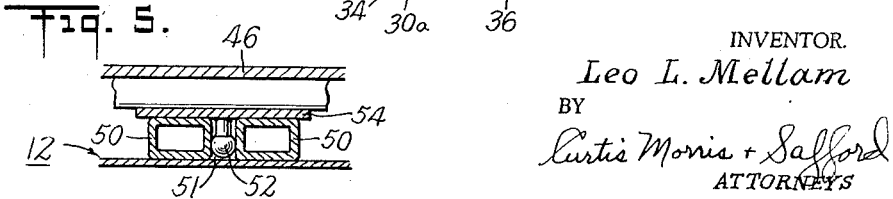
INVENTOR.
Leo L. Mellam
BY
Curtis Morris + Safford
ATTORNEYS

United States Patent Office 2,933,053
Patented Apr. 19, 1960

2,933,053

RAILWAY CAR FOR TRANSPORTING TRAILER BODIES

Leo L. Mellam, New York, N.Y., assignor to Flexi-Van, Inc., New York, N.Y., a corporation of Delaware Application May 28, 1957, Serial No. 662,047

6 Claims. (Cl. 105—368)

This invention relates to the construction of specialized railway cars for transporting trailer bodies of the type which are transferable to and from highway wheel assemblies so that the trailer bodies may be carried either by rail or highway.

In my copending application Serial No. 637,462, filed January 31, 1957, there is disclosed a trailer body of this type which is provided at its undersurface with a pair of spaced, parallel framing members which are adapted for longitudinally slidable, laterally interlocking engagement with rail members on the highway wheel assembly and with similar rail members on a turntable mounted on the railway car. To transfer the trailer body between the railway car and the highway wheel assembly, the trailer body is pushed or pulled lengthwise from one pair of these rail members to the other by the truck tractor. The transfer is accomplished with the trailer body oriented transversely of the railway car; to fix the trailer body in position on the railway car for transit, the turntable is rotated to align the trailer body parallel to the axis of the railway car, where it is locked against rotation.

It is among the objects of the present invention to provide an improved railway car construction which is especially adapted for the efficient handling of trailer bodies of the aforesaid type. Another object is that of providing such a railway car which is light in weight and economical in construction. A further object is the provision of such a railway car in which the trailer body is locked at the proper position for rail transport by means which is very easily engaged, and which, although it is simple and economical in construction, is foolproof in operation.

Other and further objects will be apparent from the ensuing description and the accompanying drawings in which:

Figure 1 is an isometric view of a railway car embodying features of the present invention.

Figure 2 is a fragmentary plan view of the locking device at one end of the railway car.

Figures 3, 4 and 5 are transverse sectional views of the railway car taken respectively along the lines 3—3, 4—4, 5—5 of Figure 1, with a trailer body shown in position on the railway car.

As may be seen in Figure 1, the railway car of the present invention has an elongated frame which includes an intermediate section 10 extending between end platforms 12 and 14 which rest upon the bolsters of the railway wheel trucks 16.

The intermediate section 10, which is a single composite girder, is substantially narrower than the end platforms 12 and 14 and preferably even narrower than the wheel trucks 16.

The central portion 10a of the intermediate section is at a reduced height relative to the end portions of this section. Mounted in this dropped center section 10a is a turntable 18 which includes a pair of rail members 20 which extend parallel to each other and are spaced apart for longitudinally slidable, laterally interlocking engagement with the angle members which extend along the bottom of the trailer body as shown in the aforesaid copending application Serial No. 637,462. These rail members 20 are braced by suitable transverse members 22 and are supported by a central plate 24 which is secured at the upper end of a hollow inner cylinder 26, as shown in Figure 4. This inner cylinder 26 is slidably and rotatably received within an outer cylinder 28 which is fixed at the center of the intermediate section 10 of the railway car.

For raising the turntable relative to the railway car, a hydraulic cylinder 30 (Figure 4) is mounted within the inner cylinder 26 of the turntable 18. The casing of the cylinder 30 is pivotally connected at its lower end to the railway car by means of a bolt 32 which is received through an extension 30a at the lower end of the casing and through a mounting bracket 34 secured to a plate 36 which extends across the bottom of the intermediate section 10 of the car. The piston 38 of the cylinder 30 is connected to the upper plate 24 of the turntable 18 by means of a bolt 40 which extends through an extension 38a on the upper end of the piston rod and through a bracket 42 welded to the undersurface of the plate 24.

As may be seen in Figure 1, fixed at one side of the railway car is a hydraulic control, generally designated 48, for supplying hydraulic fluid under pressure to the hydraulic cylinder 30. This control 48 includes an electric motor, a pump driven thereby, and a manually controlled valve for controlling the supply of hydraulic fluid under pressure from the pump to the hydraulic cylinder 30. When the hydraulic fluid is thus supplied to cylinder 30, the turntable 18 may be raised from the position shown in full lines in Figure 4 to that shown in broken lines.

Secured at the forward end of the railway car on the upper surfaces of the end platform 12 and the forward portion of the intermediate section 10 are a pair of supporting bars 50 which extend parallel to each other along the length of the car and which are spaced apart a short distance to provide between them an elongated slot 51 in which may be received the king pin 52 which projects downwardly from a swivel plate 54 at the forward end of the trailer body 46. These supporting bars 50 not only support the forward end of the trailer body 46, but they also confine the king pin laterally so as to prevent rotational movement of the trailer body relative to the railway car. The elongated slot 51 between the supporting bars 50 accommodates trailer bodies of different length without adjustment of the bars 50, and allows the king pin 52 on the forward end of any of such trailer bodies to enter in between and be confined by the bars 50.

Mounted at the rear end of the railway car on the upper surfaces of the end platform 14 and the rear portion of the intermediate section 10 are a pair of rails 56 which extend parallel to each other along the car and which are spaced apart to cooperate with the angle members 44 which extend along the under surface of the trailer body 46, as shown in Figure 3. These rails 56 not only support the rearward end of the trailer body but also aid in preventing rotational movement of the trailer body relative to the railway car.

To aid in preventing tipping movement of the trailer body relative to the railway car, a pair of locking members 58 are respectively mounted adjacent the rails 56, as shown in Figures 1, 2 and 3. These locking members 58 are mounted for transverse sliding movement in a guide channel 60 (see particularly Figure 2) and are actuated by means of links 62, one end of each of the two links 62 being pivotally connected to one of the two locking members 58 and the other ends of each of the two links being connected at opposite sides of the pivot 64a of the lever 64. The rear end of the lever 64 is pivotally attached to a plate 66 by means of a bolt 68 which is received in a longitudinal slot 66a in the plate. The plate 66 is secured to an actuating rod 70 which extends transversely of the car and is slidably supported in brackets 72 secured to the forward edge of the end platform 14. The actuating rod 70 is provided at either end with handles 74 by which the rod 70 may be pushed or pulled transversely of the car.

A coil spring 76 which is tensioned between the lever 64 and one of the two rails 56 urges the lever 64 to the position shown in full lines in Figure 2, at which position the locking members 58 are pushed outwardly so that they extend over the upper flanges 44a of the angle members 44 and lock the trailer body 46 on the rails 56.

Movement of the actuating rod 70 to the right, as viewed in Figure 2, causes rotation of the lever 64 to the position shown in broken lines in that figure, against the resistance of the spring 76, pulling the links 62 inwardly and causing inward movement of the locking members 58 to release the angle members 44 of the trailer body 46 and permit the trailer body 46 to be lifted off the rails 56 of the railway car.

When a trailer body is to be loaded on the railway car, the turntable 18 is raised to its upper position, as shown in broken lines in Figure 4, and is rotated to orient the rails 20 transversely of the car. Then the trailer body is slid lengthwise off the highway wheel assembly onto the turntable, with the angle members 44 at the underside of the trailer body sliding onto the rails 20 of the turntable 18. The vertical flanges of the angle members 44 engage the outer edges of the rails 56 and insure proper lateral positioning of the trailer body relative to the turntable. When the trailer body reaches the proper longitudinal position on the turntable 18, at which the center of gravity of the trailer body is approximately coincident with the axis of the turntable, a pair of hook members at the bottom of the trailer body engage pins 77 (Figure 1) projecting outwardly from the edges from the rails 18. Simultaneously, projections on the rails engage trip members 78 projecting outwardly from the rails and actuate them to release locking pins 80 and cause them to project outwardly from the rails into locking engagement with openings in the vertical flanges of the angle members 44.

Then, with the trailer body thus locked in proper longitudinal position on the turntable 18, the turntable is rotated to align the trailer body longitudinally of the railway car. This rotational movement of the turntable 18 is accommodated by rotation of the piston 38 (Figure 4) of the hydraulic cylinder 30 relative to the casing. When the trailer body is properly aligned with the railway car, the control means 48 (Figure 1) is actuated to remove the pressure fluid from the hydraulic cylinder 30 and allow the turntable 18 to descend from the position shown in broken lines in Figure 4 to that shown in full lines.

As the trailer body is lowered, the king pin 52 (Figure 5) is engaged between the supporting bars 50, and the angle members 44 (Figure 3) engage the outer surfaces of the rails 56 (Figure 3). Then one of the two handles 74 (Figure 2) is actuated to move the locking members 58 outwardly into position as shown in Figures 2 and 3 to lock the angle members 44 on the rails 56. The trailer body is thus secured on the railway car for transit. When the trailer body arrives at its destination, it may be removed from the railway car simply by reversing the steps described.

From the foregoing description it will be understood that the railway car shown and described is capable of very efficient handling of the trailer bodies and includes provisions for locking the trailer bodies in position, the locking means being easily engaged and relatively foolproof. It will also be understood that the construction of the railway car is inexpensive and light weight in construction.

Moreover, it is well adapted for easy assembly and for convenient repairs. For example, if the turntable 18 and/or the hydraulic cylinder 30 is damaged or for any other reason needs to be replaced, these parts may be removed simply by raising the turntable and removing the bolts 40 and 32 through the openings 82 and 84 in the inner and outer cylinders 26 and 28 respectively.

It will therefore be appreciated that the aforementioned and other desirable objectives have been achieved. However, it should be emphasized that the particular embodiment of the invention which is described herein and shown in the accompanying drawings is intended as merely illustrative of the principles of the invention rather than as restrictive of the scope thereof or as limiting the coverage of this patent which is defined only by the appended claims.

I claim:

1. In a railroad car for transporting trailer bodies, a frame extending longitudinally of said car with the ends of said frame being supported upon the wheel trucks of said car and with at least the intermediate portion of said frame being narrower than said wheel trucks, a pair of support members mounted on the upper surface of said frame at one end thereof, said support members being adapted to support the forward end of trailer body and being spaced apart to define a recess to receive a king pin extending downwardly from the forward end of said trailer body, a pair of rail members at the upper surface of said frame at its other end, said rail members extending parallel to each other and longitudinally of said car and being spaced apart for respective engagement with angle members extending along the bottom of said trailer body, a turntable mounted at the central portion of the upper surface of said frame, said turntable including a pair of rail members extending parallel to each other and being spaced apart for longitudinally slidable, laterally interlocking engagement with said angle members for support of said trailer body on said turntable, locking means on the latter said rail members for engaging said angle members and preventing longitudinal movement of said trailer body relative to said turntable, and means for raising said turntable to a level where the king pin and the angle members of a trailer body supported thereon will respectively clear said support members and the rail members mounted on said other end of said frame during rotation of said trailer body and said turntable relative to said car.

2. In a railroad car for transporting trailer bodies, end platforms at either end of said car supported upon and extending transversely over the wheel trucks thereof, an intermediate section extending between said end platforms, said intermediate section being substantially narrower than said end platforms, a pair of support members on one of said end platforms, said support members being spaced apart to define a recess to receive and laterally confine a king pin extending downwardly from the forward end of said trailer body, a pair of rail members on the other of said end platforms, said rail members extending parallel to each other and longitudinally of said car and being spaced apart for respective engagement with angle members extending along the bottom of said trailer body at its rearward end, a turntable rotatably mounted at the central portion of the upper surface of said intermediate section, said turntable including a pair of rail members extending parallel to each other and being spaced apart for longitudinally slidable, laterally interlocking engagement with said angle members for support of said trailer body on said turntable, locking means on the latter said rail members for engaging said angle members and preventing longitudinal movement of said trailer body relative to said turntable, and means for raising said turntable to a level where the king pin and the angle members of a trailer body supported thereon will respectively clear said support members and the rail members on said other end platform during rotation of said trailer body and said turntable on said car.

3. In a railroad car for transporting trailer bodies, a frame extending longitudinally of said car with the ends of said frame being supported upon the wheel trucks of said car and with at least the intermediate portion of said frame being narrower than said wheel trucks, a pair of support members mounted on the upper surface of said frame at one end thereof, said support members being spaced apart to define a recess to receive and restrict lateral movement of a king pin extending downwardly from the forward end of said trailer body, a pair of rail members at the upper surface of said frame at its other end, said rail members extending parallel to each other and longitudinally of said car and being spaced apart for respective engagement with angle members extending along the bottom of said trailer body, a turntable mounted at the central portion the upper surface of said frame, said turntable including a pair of rail members extending parallel to each other and being spaced apart for longitudinally slidable, laterally interlocking engagement with said angle members for support of said trailer body on said turntable, locking means on the latter said rail members for engaging said angle members and preventing longitudinal movement of said trailer body relative to said turntable, and means for raising said turntable to a level where the king pin and the angle members of a trailer body supported thereon will respectively clear said support members and the rail members mounted on said other end of said frame during rotation of said trailer body and said turntable relative to said car, the upper surface of the end portions of said intermediate section being at substantially the same height as the upper surfaces of said end platforms, and the central portion of said intermediate section being of reduced height along a length of the rail members on said turntable, whereby said turntable may be lowered to a position at which the rail members thereon are at the same height as the rail members on said other end platform.

4. In a railroad car for transporting trailer bodies, a frame extending longitudinally of said car with the ends of said frame being supported upon the wheel trucks of said car and with at least the intermediate portion of said frame being narrower than said wheel trucks, a pair of support members mounted on the upper surface of said frame at one end thereof, said support members extending parallel to each other and longitudinally of said car and being spaced apart to receive and restrict lateral movement of king pins extending downwardly from the front ends of trailer bodies of a range of different overall lengths, a pair of rail members at the upper surface of said frame at its other end, said rail members extending parallel to each other and longitudinally of said car and being spaced apart for respective engagement with angle members extending along the bottom of said trailer body, a turntable mounted at the central portion the upper surface of said frame, said turntable including a pair of rail members extending parallel to each other and being spaced apart for longitudinally slidable, laterally interlocking engagement with said angle members for support of said trailer body on said turntable, locking means on the latter said rail members for engaging said angle members and preventing longitudinal movement of said trailer body relative to said turntable, and means for raising said turntable to a level where the king pin and the angle members of a trailer body supported thereon will respectively clear said support members and the rail members mounted on said other end of said frame during rotation of said trailer body and said turntable relative to said car.

5. In a railroad car for transporting trailer bodies, a frame extending longitudinally of said car with the ends of said frame being supported upon the wheel trucks of said car and with at least the intermediate portion of said frame being narrower than said wheel trucks, a pair of support members mounted on the upper surface of said frame at one end thereof, said support members being spaced apart to define a recess to receive and restrict lateral movement of a king pin extending downwardly from the forward end of said trailer body, a pair of rail members at the upper surface of said frame at its other end, said rail members extending parallel to each other and longitudinally of said car and being spaced apart for respective engagement with angle members extending along the bottom of said trailer body, a pair of locking members respectively mounted adjacent said rail members for movement into and out of engagement with the said angle members to hold said trailer body against tipping movement relative to said car, a turntable mounted at the central portion of the upper surface of said frame, said turntable including a pair of rail members extending parallel to each other and being spaced apart for longitudinally slidable, laterally interlocking engagement with said angle members for support of said trailer body on said turntable, locking means on the latter said rail members for engaging said angle members and preventing longitudinal movement of said trailer body relative to said turntable, and means for raising said turntable to a level where the king pin and the angle members of a trailer body supported thereon will respectively clear said support members and the rail members mounted on said other end of said frame during rotation of said trailer body and said turntable relative to said car.

6. In a railroad car for transporting trailer bodies, a frame extending longitudinally of said car with the ends of said frame being supported on the wheel trucks of the car, a turntable mounted on an intermediate portion of said frame for vertical movement and for rotation about a vertical axis, a pair of rail members on said turntable extending parallel to one another and being spaced apart for longitudinally slidable, laterally interlocking engagement with a pair of spaced, parallel angle members extending along the undersurface of the trailer body, locking means on said turntable for locking said trailer body in a longitudinal position at which the weight of said trailer body is approximately centered over said axis, supporting portions on the upper surface of said car at positions spaced at opposite sides of said turntable along the length of said car, a recess in one of said supporting portions for receiving a kingpin depending from the forward end of said trailer body and confining the same against lateral movement while permitting vertical movement of said kingpin into and out of said recess, said intermediate portion of said frame being lower than said supporting portions to receive said turntable in a lower position at which the ends of a trailer body rest on said supporting portions and said kingpin is received in said recess, and power means for elevating said turntable from said lower position to an upper position at which said trailer body is clear of said supporting portions and said kingpin is clear of said recess to permit rotation of said turntable and said trailer body relative to said car to a position at which said trailer body is oriented transversely of the car for longitudinal sliding movement of said trailer body onto or off of said turntable.

References Cited in the file of this patent

UNITED STATES PATENTS 2,543,295   McGregor et al. _____ Feb. 27, 1951

FOREIGN PATENTS 374,676     Great Britain _____ June 16, 1932
761,698     Great Britain _____ Nov. 21, 1953
1,127,129   France _____ Aug. 6, 1956